(12) United States Patent
Kai et al.

(10) Patent No.: US 8,397,994 B2
(45) Date of Patent: Mar. 19, 2013

(54) WIRELESS TAG

(75) Inventors: Manabu Kai, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 12/913,360

(22) Filed: Oct. 27, 2010

(65) Prior Publication Data

US 2011/0121080 A1 May 26, 2011

(30) Foreign Application Priority Data

Nov. 20, 2009 (JP) ................................ 2009-264522

(51) Int. Cl.
*G06K 19/00* (2006.01)

(52) U.S. Cl. ....................................... 235/487; 235/494

(58) Field of Classification Search .................. 235/487, 235/494, 380
See application file for complete search history.

(56) References Cited

U.S. PATENT DOCUMENTS

| | | | |
|---|---|---|---|
| 5,608,417 A | 3/1997 | de Vall | |
| 6,049,461 A | 4/2000 | Haghiri-Tehrani et al. | |
| 6,050,622 A | 4/2000 | Gustafson | |
| 7,126,482 B2 | 10/2006 | Shoji et al. | |
| 7,598,873 B2 | 10/2009 | Yamagajo et al. | |
| 7,916,032 B2 | 3/2011 | Baba et al. | |
| 7,936,273 B2 | 5/2011 | Kobayashi et al. | |
| 2006/0214798 A1* | 9/2006 | Wang | 340/572.7 |
| 2007/0236333 A1 | 10/2007 | Reuker | |

FOREIGN PATENT DOCUMENTS

| | | |
|---|---|---|
| CN | 1734478 A | 2/2006 |
| FR | 2 904 453 | 2/2008 |
| JP | 2002-252518 | 9/2002 |
| JP | 2007-272264 | 10/2007 |
| JP | 2008-009882 | 1/2008 |
| JP | 2008-090813 | 4/2008 |

OTHER PUBLICATIONS

Korean Official Action mailed Nov. 2, 2011 for corresponding Korean Application No. 10-2010-101976, with English-language Translation.
"Extended European Search Report", mailed by EPO and corresponding to European Patent application No. 10187396.6 on Mar. 26, 2012.
Chinese Office Action mailed Aug. 9, 2012 for corresponding Chinese Application No. 201010546838.2, with English-language Translation.
European Search Report mailed by EPO and corresponding to European application No. 10187396.6 on Jul. 16, 2012.

* cited by examiner

*Primary Examiner* — Karl D Frech
(74) *Attorney, Agent, or Firm* — Fujitsu Patent Center

(57) ABSTRACT

A wireless tag includes: a wireless communication circuit that includes first and second terminals coupled to a loop antenna and performs wireless communication using the loop antenna; a first conductor that forms a first curved surface and includes a third terminal disposed at a first end of the first curved surface and coupled to the first terminal, and includes a first area including a second end of the first curved surface; and a second conductor that forms a second curved surface, includes a fourth terminal disposed at a third end of the second curved surface and coupled to the second terminal, and includes a second area including a fourth end of the second curved surface, the second area being parallel to the first area and overlapping with the first area, the first and second curved surfaces forming the loop antenna.

13 Claims, 11 Drawing Sheets

WIRELESS TAG

CROSS-REFERENCE TO RELATED APPLICATIONS

This application is based upon and claims the benefit of priority of the prior Japanese Patent Application No. 2009-264522, filed on Nov. 20, 2009, the entire contents of which are incorporated herein by reference.

FIELD

The embodiments discussed herein are related to a wireless tag.

BACKGROUND

For example, a dipole-type RFID (radio frequency identification) tag that is used in the UHF band is known as a wireless tag. The dipole-type RFID tag is attached to non-metal objects, such as cardboard or clothing. When attached to a metallic surface, the dipole-type RFID tag stops transmitting radio waves, the gain of an antenna drops, and the matching between the antenna and a chip collapses, making it impossible for the dipole-type RFID tag to communicate with a reader/writer (RW).

A loop antenna is known as one example of an antenna that can be attached to metal. A loop plane is installed so as to be perpendicular to a metallic plane. Therefore, mirror current flows on the opposite side of the metallic plane, meaning that the loop antenna has a larger loop than what the loop antenna actually has. Therefore, the loop antenna can communicate even when attached to the metallic plane. The loop antenna is equipped only with a wire forming the loop and a chip connected to the wire to operate.

What is known as a related technology is a RFID tag in which an antenna sheet is wound around a dielectric substrate with both ends of the antenna sheet being connected in a chip portion. However, the cost of producing the RFID tag is expensive. Since a chip terminal and the end of the antenna are connected, the connection point is fragile and could peel off. In particular, the RFID tag that can be attached to a metallic plane is for example used in an automobile assembly line and attached to bodies. In this case, a powerful force could be applied to the RFID.

The following RFID tag is also known: a chip is mounted on one antenna sheet wound on a dielectric substrate, and both ends of the antenna come closer to each other and thus are C-coupled (capacitively coupled). Thanks to the C-coupling (capacitive coupling), both ends of the antenna are coupled in a RFID frequency band (860 MHz to 960 MHz, for example). The distance of a gap of the C-coupled portion needs to be of the order of several dozen micrometers. However, in reality, it is difficult to maintain the distance of the gap due to the bending of the dielectric substrate and other factors. Moreover, the cost of producing the RFID tag is expensive.

[Patent Document 1] Japanese Laid-open Patent Publication No. 2007-272264

[Patent Document 2] Japanese Laid-open Patent Publication No. 2008-90813

However, as mentioned in the above example of the wireless tag, it is difficult to produce a wireless tag that is able to communicate even when attached to metal and has stable performance.

SUMMARY

According to an aspect of the invention, a wireless tag includes: a wireless communication circuit that includes first and second terminals coupled to a loop antenna and performs wireless communication using the loop antenna; a first conductor that forms a first curved surface and includes a third terminal disposed at a first end of the first curved surface and coupled to the first terminal, and includes a first area including a second end of the first curved surface; and a second conductor that forms a second curved surface, includes a fourth terminal disposed at a third end of the second curved surface and coupled to the second terminal, and includes a second area including a fourth end of the second curved surface, the second area being parallel to the first area and overlapping with the first area, the first and second curved surfaces forming the loop antenna.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram illustrating the operation of a chip and antenna of a RFID tag 1a;

FIG. 2 is a circuit diagram illustrating an equivalent circuit of the chip and antenna of the RFID tag 1a;

FIG. 3 is an exploded view illustrating the structure of the RFID tag 1a;

FIG. 8 is a side view illustrating the structure of an overlap portion 24a;

FIG. 9 is a cross-sectional view illustrating the structure of the RFID tag 1a;

FIG. 10 is a perspective view illustrating the structure of the RFID tag 1a;

DESCRIPTION OF EMBODIMENTS

Hereinafter, embodiments of the present invention will be described with reference to the accompanying drawings.

First Embodiment

The following describes a RFID tag 1a of the first embodiment, which is an example of application of a wireless tag of the present invention. The RFID tag 1a wirelessly communicates with a reader/writer with a RFID frequency in the UHF band. The reader/writer reads out data from the RFID tag 1a through wireless communication and writes data to the RFID tag 1a through wireless communication.

Figure 1:
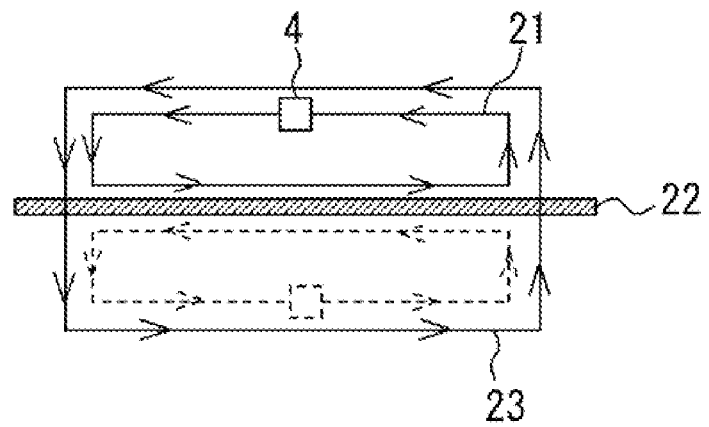

FIG. 1 is a schematic diagram illustrating the operation of a chip and antenna of the RFID tag 1a. The RFID tag 1a includes a chip 4 and an antenna 21 that is a loop antenna. When the RFID tag 1a is attached to a metallic plane 22, the antenna 21 uses mirror current 23 just as the above loop antenna does.

The following describes the relationship between the chip 4 and the antenna 21. The chip 4 is a semiconductor chip that includes a wireless communication circuit to wirelessly communicate with the reader/writer using the antenna 21. The chip 4 is for example LSI (Large Scale Integration).

Figure 2:
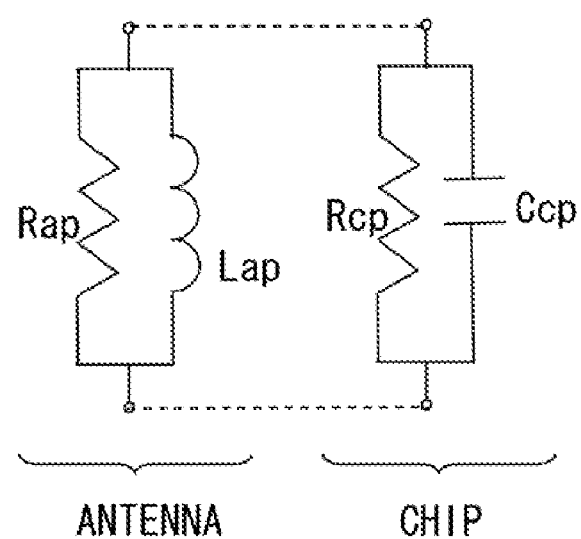

FIG. 2 is a circuit diagram illustrating an equivalent circuit of the chip and antenna of the RFID tag 1a. The equivalent circuit of the chip 4 is represented by parallel resistance Rcp and parallel capacitance Ccp. For example, Rcp is about 2,000Ω; Ccp is about 1.0 pF. The equivalent circuit of the antenna 21 is represented by parallel resistance (radiation resistance) Rap and parallel inductance Lap. It is necessary for two terminals of the chip 4 and two terminals of the antenna 21 to be directly connected without a matching circuit therebetween. In this case, a resonance condition of the chip 4 and antenna 21 is represented by the following equation.

$$f0 = \frac{1}{2\pi\sqrt{Lap \cdot Ccp}}$$ [Equation 1]

When Ccp and Lap satisfy the resonance condition at a RFID frequency (a specific frequency) of f0 and the values of Rcp and Rap are the same, all power received by the antenna 21 is supplied to the chip 4. For example, f0 is 860 MHz to 960 MHz in the UHF band. For example, when Ccp is 1.0 pF, f0 is 953 MHz and Lap 28 nH. When Ccp and Lap are out of the resonance condition or when the values of Rcp and Rap are different, mismatching occurs between the chip 4 and the antenna 21, making the communication distance of the RFID tag shorter. Unlike a conventional portable terminal antenna or wireless LAN antenna, the antenna 21 of the UHF-band RFID tag 1a is not connected to a 50Ω (or 75Ω) high frequency circuit. Accordingly, the antenna 21 does not have to satisfy the following condition of the conventional portable terminal antenna: input impedance Rap is 50Ω and the imaginary components of the input impedance (C and L components) are 0. Therefore, a different antenna design method from that of the conventional portable terminal antenna is used in designing the antenna 21. Since the antenna 21 and the chip 4 are directly connected together without a matching circuit, Rap and Lap are, for example, necessary to be about 2,000Ω and 28 nH, respectively as mentioned above.

The following describes a RFID tag production method to produce the RFID tag 1a to which the present invention is applied.

Figure 3:
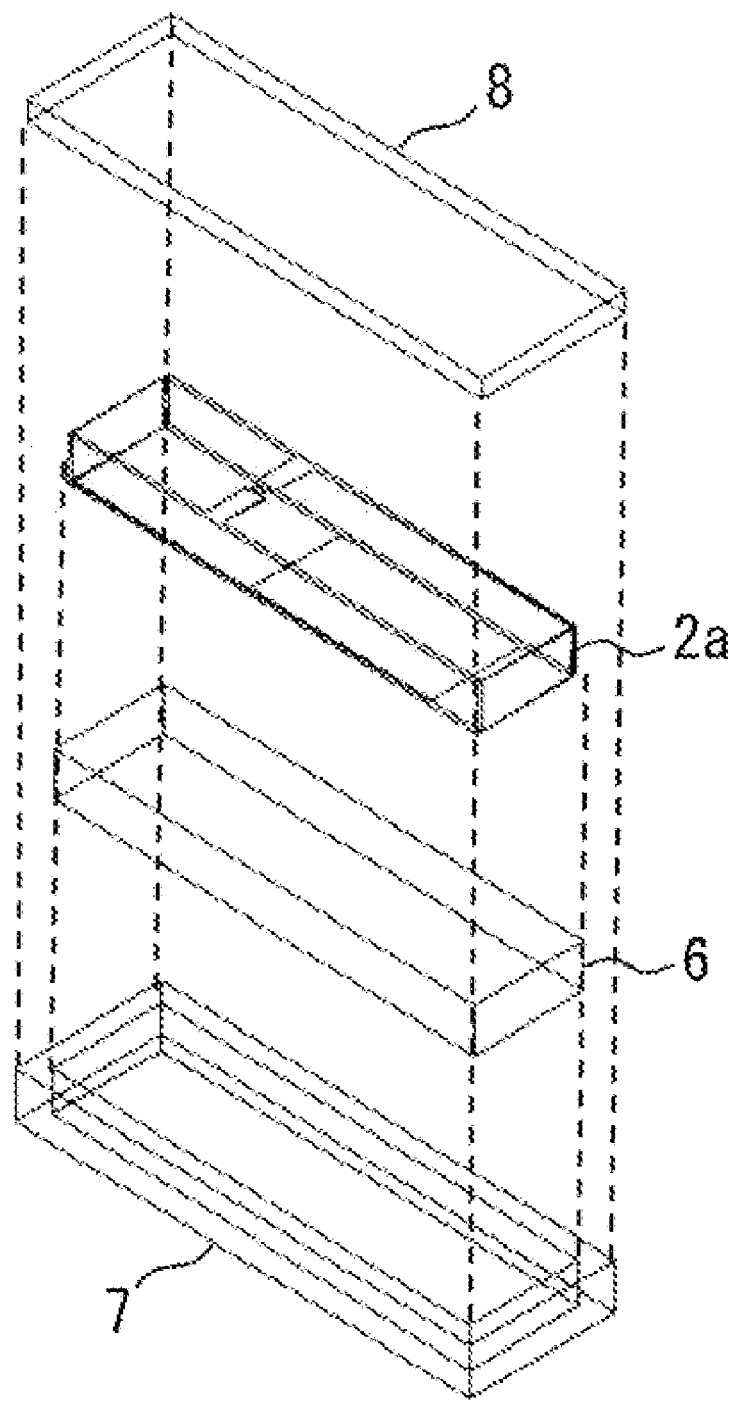
Figure 4:
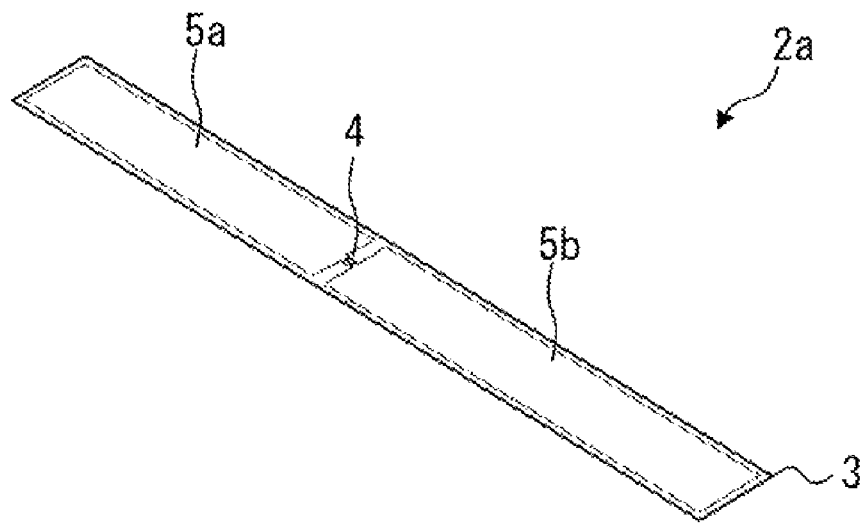
FIG. 4 is a perspective view illustrating the structure of an antenna sheet 2a before being wound around core resin 6.

FIG. 3 is an exploded view illustrating the structure of the RFID tag 1a. The RFID tag 1a includes an antenna sheet 2a, core resin 6, a container 7 and a lid 8. FIG. 4 is a perspective view illustrating the structure of the antenna sheet 2a before being wound around the core resin 6.

Figure 5:
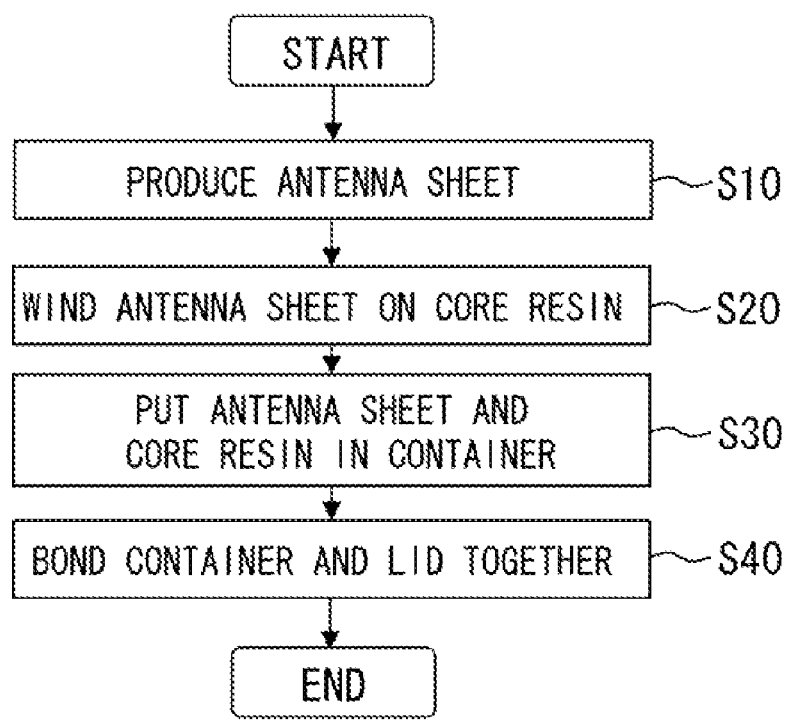
FIG. 5 is a flowchart illustrating a RFID tag production method.

FIG. 5 is a flowchart illustrating the RFID tag production method. According to the RFID tag production method, the antenna sheet 2a is generated by putting the chip 4 and metallic patterns 5a and 5b on an insulating film sheet 3 (S10). According to the RFID tag production method, the chip is disposed at the center of the film sheet 3 and silver paste is sprayed on the film sheet 3, thereby forming the metallic patterns 5a and 5b and connecting a first terminal of the chip 4 to the metallic pattern 5a and a second terminal of the chip 4 to the metallic pattern 5b. The first and second terminals are feeding points of the antenna 21.

A first end is one of the longer-direction ends of the metallic pattern 5a that is closer to the chip 4 than the other end is. A second end is one of the longer-direction ends of the metallic pattern 5a that is on the opposite side of the metallic pattern 5a from the chip 4. A third end is one of the longer-direction ends of the metallic pattern 5b that is closer to the chip 4 than the other end is. A fourth end is one of the longer-direction ends of the metallic pattern 5b that is on the opposite side of the metallic pattern 5b from the chip 4.

Figure 6:
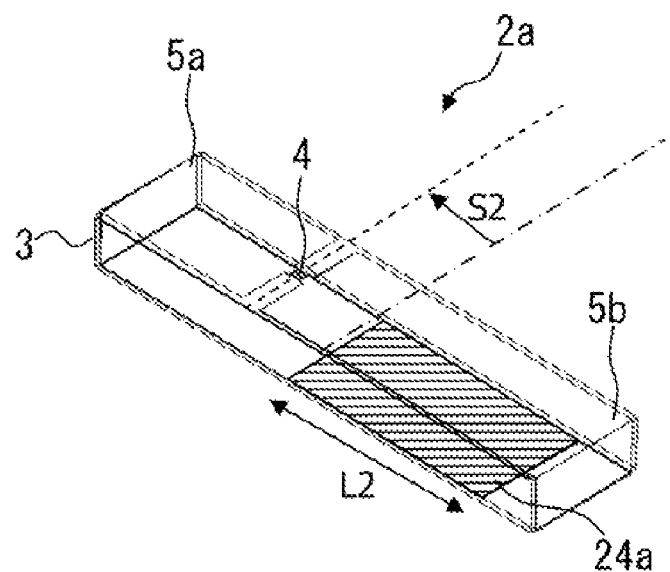
FIG. 6 is a perspective view illustrating the structure of the antenna sheet 2a wound around the core resin 6.

FIG. 6 is a perspective view illustrating the structure of the antenna sheet 2a wound around the core resin 6. According to the RFID tag production method, the antenna sheet 2a is wound around a predetermined position of the core resin 6 (S20). In this case, the antenna sheet 2a is wound around the core resin 6 so that the longer direction of the antenna sheet 2a is aligned with the longer direction of the core resin 6. With the center of the top surface of the core resin 6 being regarded as a point of reference, the chip 4 is positioned at a position (a specific position) S2 of the longer direction of the core resin 6. The longer-direction length of the antenna sheet 2a is longer than the longer-direction perimeter of the core resin 6: the difference in length is L2. Accordingly, both ends of the longer direction of the antenna sheet 2a wound around the core resin 6 have overlapping portions.

An area of the metallic pattern 5a that lies on the metallic pattern 5b through the film sheet 3 so as to be parallel to the metallic pattern 5b is defined as a first area. An area of the metallic pattern 5b that lies on the metallic pattern 5a through the film sheet 3 so as to be parallel to the metallic pattern 5a is defined as a second area. The first and second areas are defined as an overlap portion 24a. In this case, the overlap portion 24a is on the under surface of the core resin 6. The length of the overlap portion 24a in the longer direction of the core resin 6 is L2. In this manner, the predetermined position described above is determined by S2 and L2.

Figure 7:
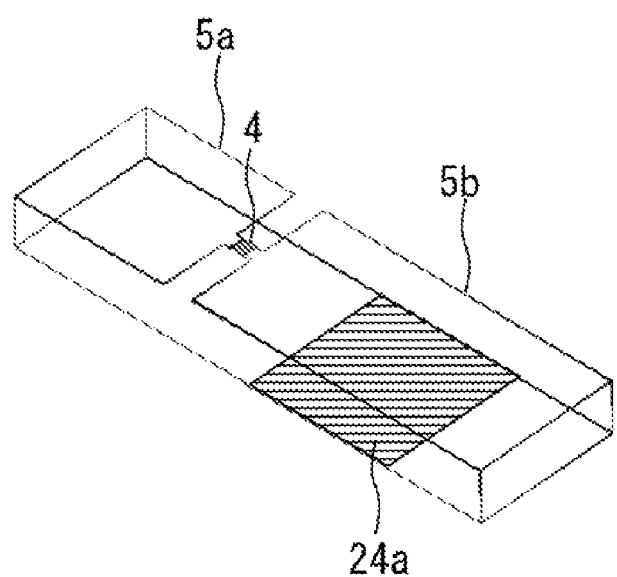
FIG. 7 is a perspective view illustrating the structures of a chip 4 and metallic patterns 5a and 5b.

FIG. 7 is a perspective view illustrating the structures of the chip 4 and metallic patterns 5a and 5b. The metallic patterns 5a and 5b form the antenna 21 that is a loop antenna.

Figure 8:
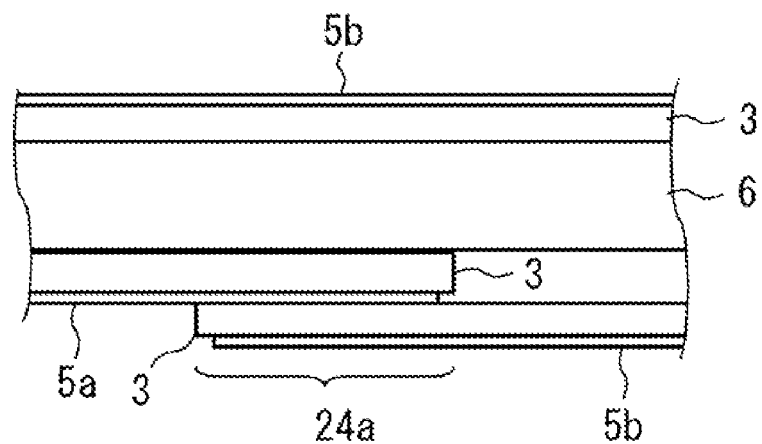

FIG. 8 is a side view illustrating the structure of the overlap portion 24a. The overlap portion 24a has a gap between the two metallic patterns 5a and 5b: the size of the gap is equal to the thickness of the insulating film sheet 2 (0.1 mm, for example). In this manner, the metallic patterns 5a and 5b are coupled in the high-frequency RFID frequency band thanks to C-coupling; it is not necessary for the metallic patterns 5a and 5b to be DC-coupled.

The core resin 6 is for example made of synthetic resin (plastics), such as ABS resin, PET resin or polycarbonate resin.

According to the RFID tag production method, the antenna sheet 2a and the core resin 6 are put in the container 7 (S30). The container 7 is made of the same material as the core resin 6, i.e. synthetic resin, and produced by resin molding.

According to the RFID tag production method, the lid 8 is put over the top opening of the container 7, the container 7 and the lid 8 are bonded together, and the container 7 is sealed with the lid 8 (S40). The lid 8 is made of the same material as the core resin 6, i.e. synthetic resin. In this case, the container 7 and the lid 8 are bonded together with an adhesive, screw or the like.

Figure 9:
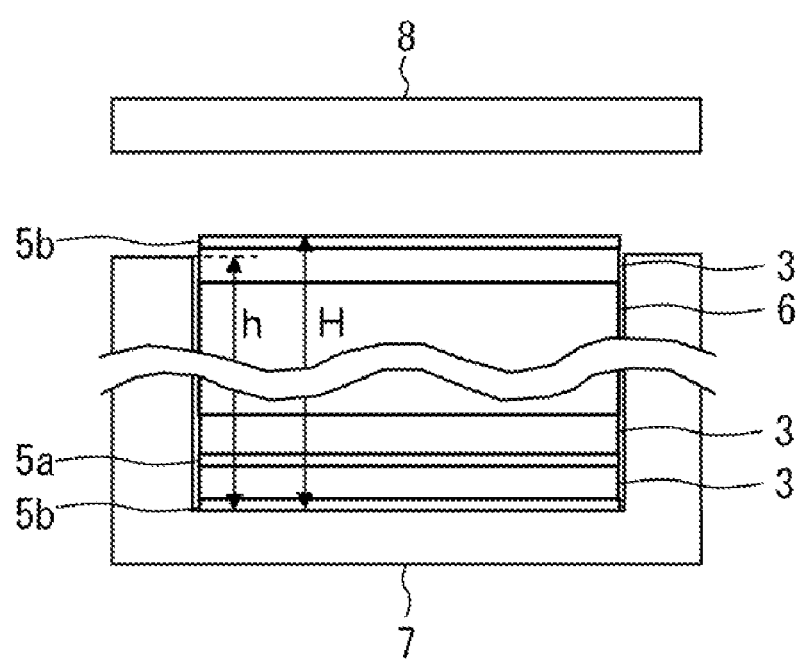

FIG. 9 is a cross-sectional view illustrating the structure of the RFID tag 1a. The cross-sectional view illustrates the film sheet 3, the metallic patterns 5a and 5b, the core resin 6, the container 7 and the lid 8. The depth of the inner wall of the container 7 is represented by h. The height of a portion (a combination) in which the metallic pattern 5a, the film sheet 3, the core resin 6, the film sheet 3, the metallic pattern 5a, the film sheet 3 and the metallic pattern 5b are combined inside the container 7 is represented by H. With H>h, the container 7 and the lid 8 are bonded together, thereby keeping the gap between the metallic patterns 5a and 5b of the overlap portion 24a constant. Thus, it is not necessary for the first and second areas making up the overlap portion 24a to be combined. In this case, the container 7 and the lid 8 are elastic; the lid 8 bends like a spring. The overlap portion 24a may be bonded with an adhesive or the like therebetween.

Figure 10:
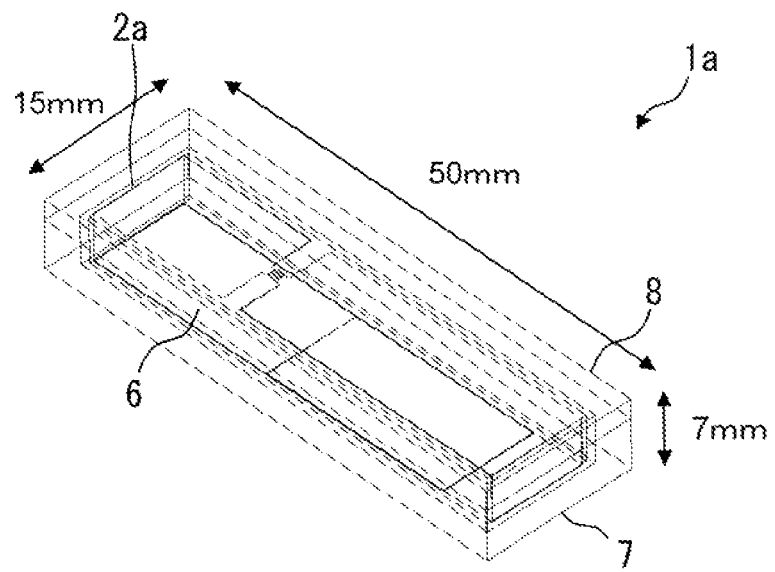

FIG. 10 is a perspective view illustrating the structure of the RFID tag 1a. The dimensions of the RFID tag 1a are for example 50 mm×15 mm×7 mm, extremely compact as a UHF-band RFID tag. The antenna sheet 2a is wound around the core resin 6; the antenna sheet 2a and the core resin 6 are covered with the container 7 and lid 8. Therefore, the mechanical strength of the RFID tag 1a is maintained.

The flow of the RFID tag production method ends with the above process.

The following describes a RFID tag design method to design the RFID tag 1a.

According to the RFID tag design method, with the use of an electromagnetic field simulator, antenna input impedance and the like, when seen from the chip 4, are calculated with varying L2 and S2. Here, the core resin 6, the container 7 and the lid 8 are dielectric materials with relative permittivity ∈r=3. When the thickness of the film sheet 3 is 0.1 mm, the gap between the metallic patterns 5a and 5b of the overlap portion 24a is 0.1 mm. As in the above example, Ccp=1.0 pF and Rcp=2,000Ω in the chip 4.

Figure 11:
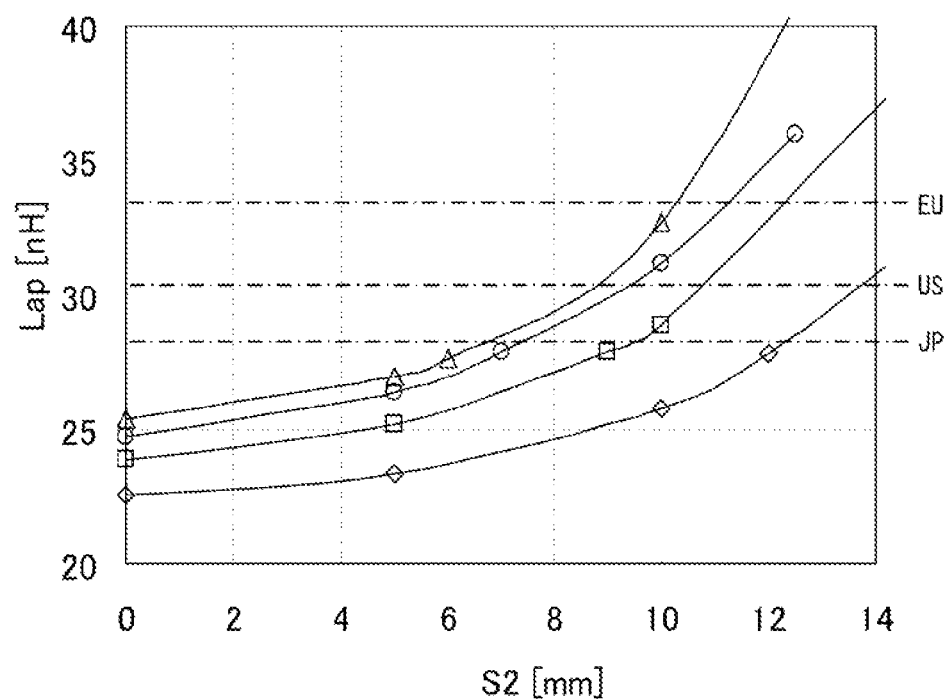
FIG. 11 is a diagram illustrating calculated values of the relationship between S2 and Lap.

FIG. 11 is a diagram illustrating calculated values of the relationship between S2 and Lap. In the diagram, the horizontal axis represents S2 [mm], and the vertical axis Lap [nH]. The curve with triangles represents the case where L2 is 5 [mm]. The curve with circles represents the case where L2 is 10 [mm]. The curve with squares represents the case where L2 is 20 [mm]. The curve with diamonds represents the case where L2 is 45 [mm]. In this case, f0 is Japan's RFID frequency standard of 953 MHz. When f0 is 953 MHz at which the RFID tag 1a resonates, Lap is 28 nH and represented by a line having symbol JP in the diagram that illustrates calculated values of the relationship between S2 and Lap. In this case, for example, when L2 is 10 mm, S2 is 9 mm. In addition, the line having symbol US represents values of Lap when f0 is the United States RFID frequency standard of 915 MHz; the line having symbol EU represents values of Lap when f0 is the European RFID frequency standard of 868 MHz.

Figure 12:
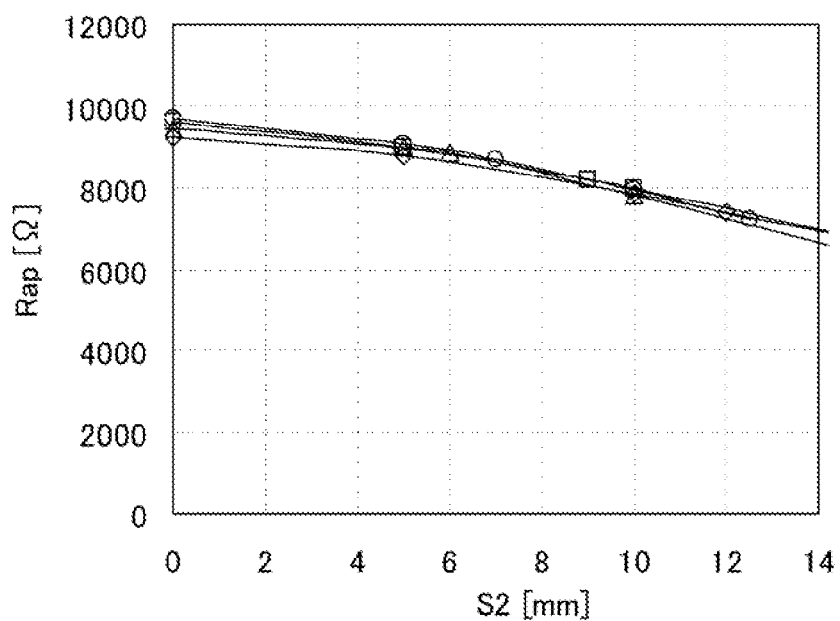
FIG. 12 is a diagram illustrating calculated values of the relationship between S2 and Rap.

FIG. 12 is a diagram illustrating calculated values of the relationship between S2 and Rap. In the diagram, the horizontal axis represents S2 [mm], and the vertical axis Rap [Ω]. The curve with triangles represents the case where L2 is 5 [mm]. The curve with circles represents the case where L2 is 10 [mm]. The curve with squares represents the case where L2 is 20 [mm]. The curve with diamonds represents the case where L2 is 45 [mm]. In the diagram that illustrates calculated values of the relationship between S2 and Rap, a dotted line represents 2,000Ω, the most appropriate value of Rap that is equal to Rcp.

According to the above-described calculated values of S2 and Rap when L2=10 mm and S2=9 mm, Rap is 8,100Ω, which is different from the most appropriate value of 2,000Ω. Even though the difference has an impact on communication distances, the impact is extremely small.

If there is a difference between Rap and the most appropriate value as in the above case, an antenna needs to be adjusted to 50Ω if the antenna is used for a portable terminal, requiring an additional matching circuit between the antenna and a high-frequency circuit (chip).

Figure 13:
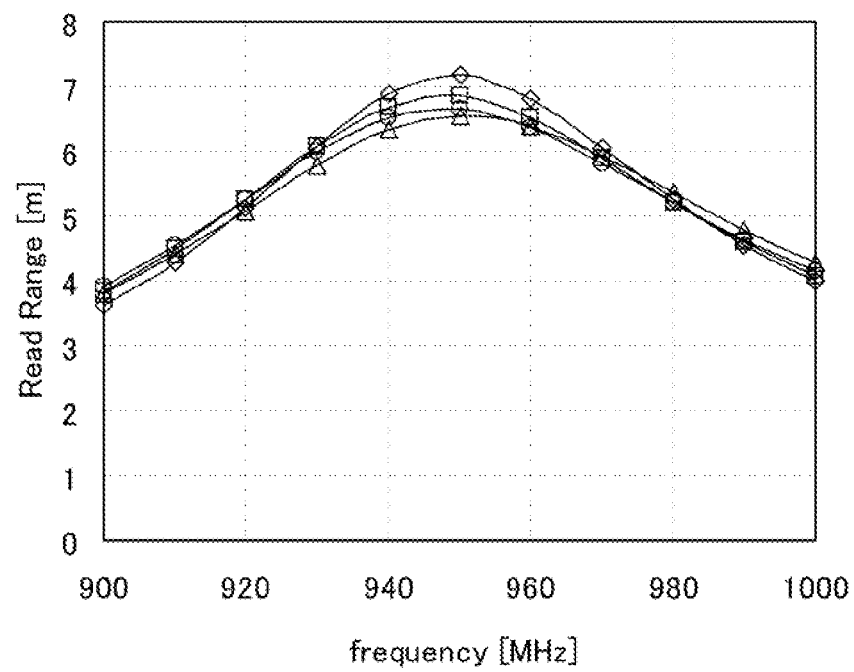
FIG. 13 is a diagram illustrating calculated values of a frequency characteristic of communication distance.

Moreover, suppose that the minimum operation power Pmin of the chip 4 is equal to −14 dBm, the output of the reader/writer that wirelessly communicates with the RFID tag 1a is 1 W (=30 dBm), and the antenna gain of the reader/writer is a linearly polarized wave of 6 dBi. In this case, the frequency characteristic of communication distance of the RFID tag 1a and reader/writer is calculated. FIG. 13 is a diagram illustrating calculated values of the frequency characteristic of communication distance. In the diagram, the horizontal axis represents frequency [MHz], and the vertical axis communication distance (read range) [m]. The curve with triangles represents the case where L2 is 5 [mm]. The curve with circles represents the case where L2 is 10 [mm]. The curve with squares represents the case where L2 is 20 [mm]. The curve with diamonds represents the case where L2 is 45 [mm]. According to the above calculated values, with f0=953 MHz, which is Japan's RFID frequency, the communication distance is about 6 m to 7 m. In this manner, the RFID tag 1a is small in size as well as has a long communication distance.

Figure 14:
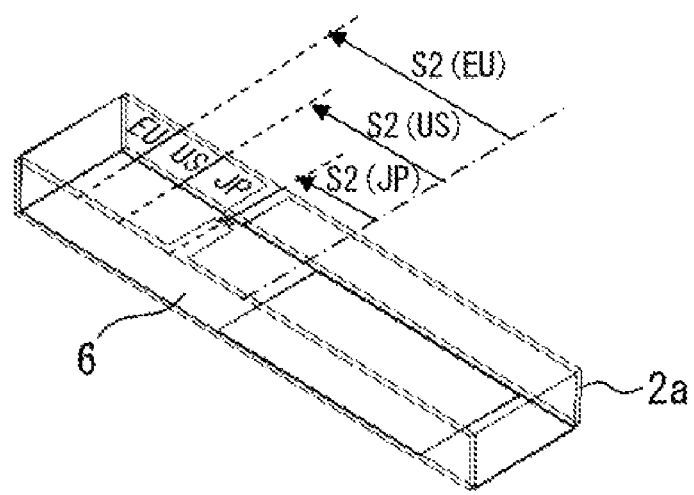
FIG. 14 is a perspective view illustrating the structure of the core resin 6 supporting a plurality of frequencies.

FIG. 14 is a perspective view illustrating the structure of the core resin 6 supporting a plurality of frequencies. According to the RFID tag design method, in order to support RFID frequencies of a plurality of countries, for example, values of S2 are calculated for the RFID frequencies of Japan, the U.S. and Europe; the core resin 6 is marked with a symbol (JP, US or EU) representing the value of S2 (the location of the chip 4) of each country. Since f0 is 953 MHz in Japan, Lap is 28 nH. Since f0 is 915 MHz in the U.S., Lap is 30 nH. Since f0 is 868 MHz in Europe, Lap is 33 nH. When L2 is 10 mm, S2(JP) is 9 mm for Japan, S2(US) 10.6 mm for the U.S., and S2(EU) 11 mm for Europe. The antenna sheet 2a is wound on the core resin 6 so that the chip 4 is positioned at the symbol of a desired country.

According to the RFID tag production method, at the above S20, the position of the chip 4 may be offset in accordance with the symbol of each country. That is, while the same material is used for the antenna sheet 2a, the core resin 6, the container 7 and the lid 8, the position of the chip 4 is moved to support the frequency of each country. Therefore, the cost of shipping to a plurality of countries decreases.

In the example described above, the thickness of the film sheet 3 is 0.1 mm but not limited to the figure. As the film sheet 3 becomes thinner, the curve of calculated values of S2 and Lap moves upward, leading to an increase in Lap. Conversely, as the film sheet 3 becomes thicker, the curve of calculated values of S2 and Lap moves downward, leading to a decrease in Lap.

It is clear from the calculated values of S2 and Lap that if L2 is fixed, the changes of Lap relative to the changes of S2 become smaller as the gradient of the curve of the calculated values of S2 and Lap becomes gentler. Therefore, the tolerable range of S2 for production relative to the most appropriate Lap becomes larger, leading to a reduction in production costs. Accordingly, L2, the dimensions of the material and the like are determined in a way that brings S2 closer to 0, i.e. to bring the position of the chip 4 closer to the center of the longer direction of the core resin 6.

It is clear from the calculated values of S2 and Lap that if Lap is fixed, S2 increases as L2 decreases. If L2 is brought closer to 0, the curve of the calculated values of S2 and Lap moves further downward, while S2 that can obtain the most appropriate value of 28 nH for Lap becomes larger. In this case, it is clear that when the length of the longer direction of the above RFID tag 1a is 50 mm, the RFID tag 1a is unfeasible. The RFID tag 1a becomes feasible if the RFID tag 1a is made larger because the loop increases in size and the inductance value rises. However, the RFID tag 1a becomes larger in size. When both ends of the antenna is C-coupled, the RFID tag 1a is feasible if the gap portion is several dozen micrometers as in the case of a conventional technique or if L2 of the RFID tag 1a is decreased. However, the RFID tag 1a becomes larger in size in both cases.

That is, since the RFID tag 1a has the overlap portion 24a, the RFID tag 1a can be made smaller in size.

Second Embodiment

Compared with the RFID tag 1a of the first embodiment, an RFID tag of the second embodiment includes an antenna sheet 2b instead of the antenna sheet 2a.

Figure 15:
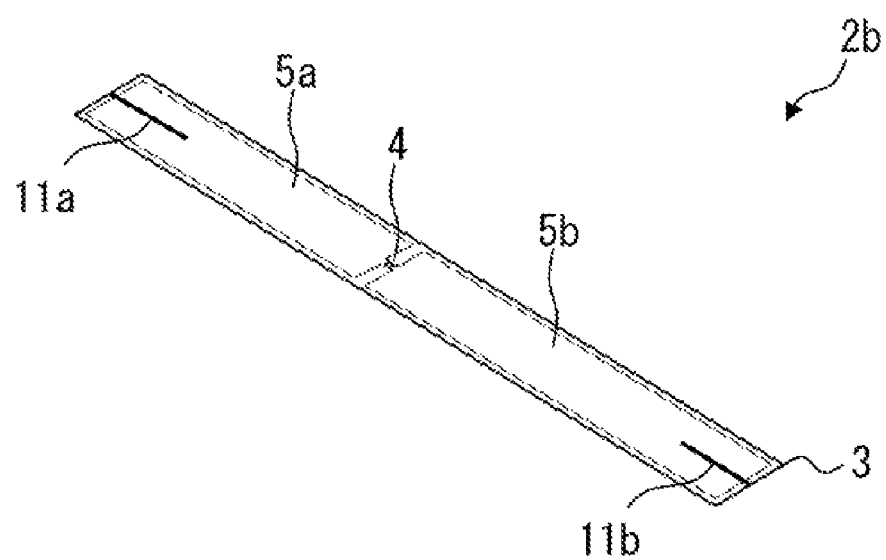
FIG. 15 is a perspective view illustrating the structure of an antenna sheet 2b before being wound around the core resin 6.

FIG. 15 is a perspective view illustrating the structure of the antenna sheet 2b before being wound around the core resin 6. On the antenna sheet 2b, the same symbols as those of the antenna sheet 2a represent the same components as, or similar components to, those of the antenna sheet 2a, which are not described here. Cuts 11a and 11b are made on the antenna sheet 2b from both ends of the longer direction toward the center. The cuts 11a and 11b are each greater than or equal to L2/2 in length. In the example illustrated in the diagram, the cuts 11a and 11b are each L2/2 in length.

Figure 16:
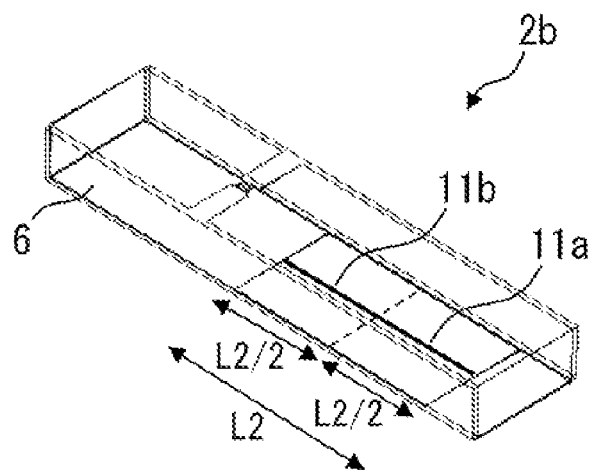
FIG. 16 is a perspective view illustrating the structure of the antenna sheet 2b wound around the core resin 6.

A RFID tag production method of the second embodiment to produce the RFID tag of the second embodiment is the same as the RFID tag production method of the first embodiment. However, according to the RFID tag production method of the second embodiment, at S20, the cuts 11a and 11b are combined after the antenna sheet 2b is wound on the core resin 6. As a result, both ends of the antenna sheet 2b are combined. FIG. 16 is a perspective view illustrating the structure of the antenna sheet 2b wound around the core resin 6. Tanks to the cuts 11a and 11b, both ends of the antenna sheet 2b are combined, making it difficult for the antenna sheet 2b wound around the core resin 6 to slip off from S20 to S30. Therefore, it becomes easier to produce the RFID tag 2b.

Third Embodiment

Figure 17:
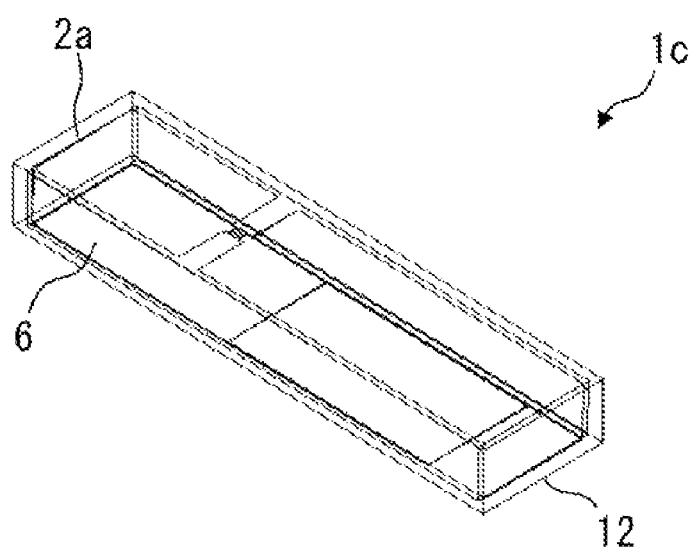
FIG. 17 is a perspective view illustrating the structure of a RFID tag 1c.

The following describes a RFID tag 1c of the third embodiment, which is an example of application of the wireless tag of the present invention. FIG. 17 is a perspective view illustrating the structure of the RFID tag 1c. In the RFID tag 1c, the same symbols as those of the RFID tag 1a represent the same components as, or similar components to, those of the RFID tag 1a, which are not described here. Compared with the RFID tag 1a, the RFID tag 1c includes a laminate film 12 instead of the container 7 and lid 8.

The following describes a RFID tag production method of the third embodiment to produce the RFID tag 1c of the third embodiment. According to the RFID tag production method of the third embodiment, the above S10 and S20 are carried out. According to the RFID tag production method of the third embodiment, instead of performing the above S30 and S40, the antenna sheet 2a and the core resin 6 are covered, or laminated, with the laminate film 12.

The structure of the RFID tag 1c is desirable when high strength is not required or when lower costs are required.

Fourth Embodiment

Figure 18:
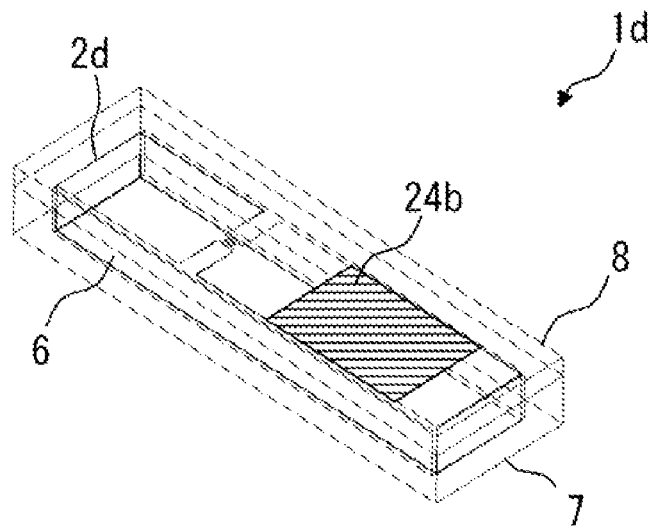
FIG. 18 is a perspective view illustrating the structure of a RFID tag 1d.

The following describes a RFID tag 1d of the fourth embodiment, which is an example of application of the wireless tag of the present invention. FIG. 18 is a perspective view illustrating the structure of the RFID tag 1d. In the RFID tag 1d, the same symbols as those of the RFID tag 1a represent the same components as, or similar components to, those of the RFID tag 1a, which are not described here. Compared with the RFID tag 1a, the RFID tag 1d includes an antenna sheet 2d instead of the antenna sheet 2a. Compared with the antenna sheet 2a, the antenna sheet 2d forms an overlap portion 24b instead of the overlap portion 24a. The difference in length between two metallic patterns of the antenna sheet 2d is larger than the difference in length between two metallic patterns of the antenna sheet 2a. Therefore, the overlap portion 24b is formed on the top surface of the core resin 6. Since the overlap portion 24b is on the top surface of the core resin 6, it is possible to confirm S2 and L2 at the same time from above, leading to a reduction in production costs.

Fifth Embodiment

The following describes a RFID tag 1e of the fifth embodiment, which is an example of application of the wireless tag of the present invention. The RFID tag 1e is smaller than the RFID tag 1a of the first embodiment.

Figure 19:
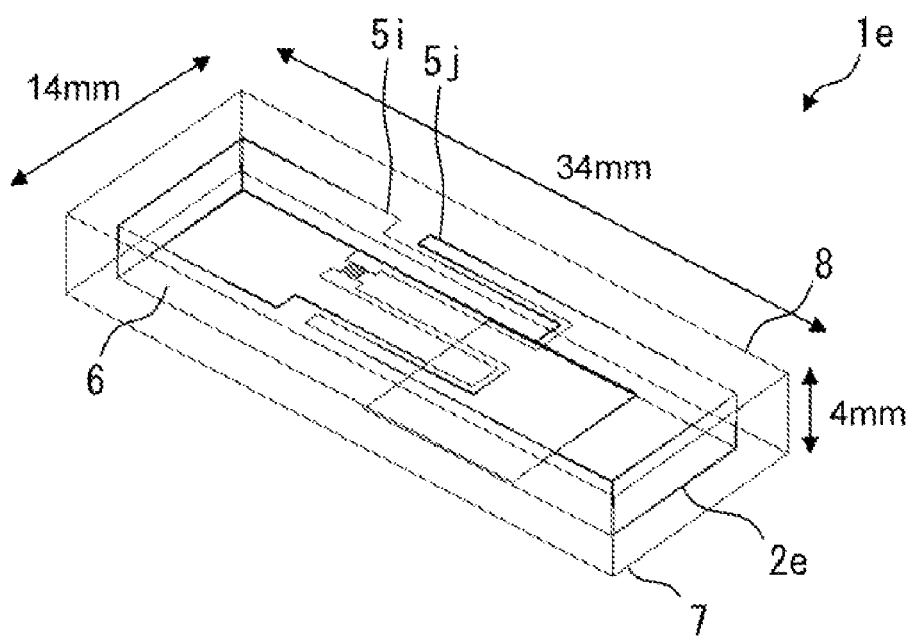
FIG. 19 is a perspective view illustrating the structure of a RFID tag 1e.

FIG. 19 is a perspective view illustrating the configuration of the RFID tag 1e. In the RFID tag 1e, the same symbols as those of the RFID tag 1a represent the same components as, or similar components to, those of the RFID tag 1a, which are not described here. Compared with the RFID tag 1a, the RFID tag 1e includes an antenna sheet 2e instead of the antenna sheet 2a. Compared with the antenna sheet 2a, the antenna sheet 2e includes metallic patterns 5i and 5j instead of the metallic patterns 5a and 5b. The dimensions of the above RFID tag 1a are 50 mm×15 mm×7 mm. The dimensions of the RFID tag 1e are 34 mm×14 mm×4 mm.

Figure 20:
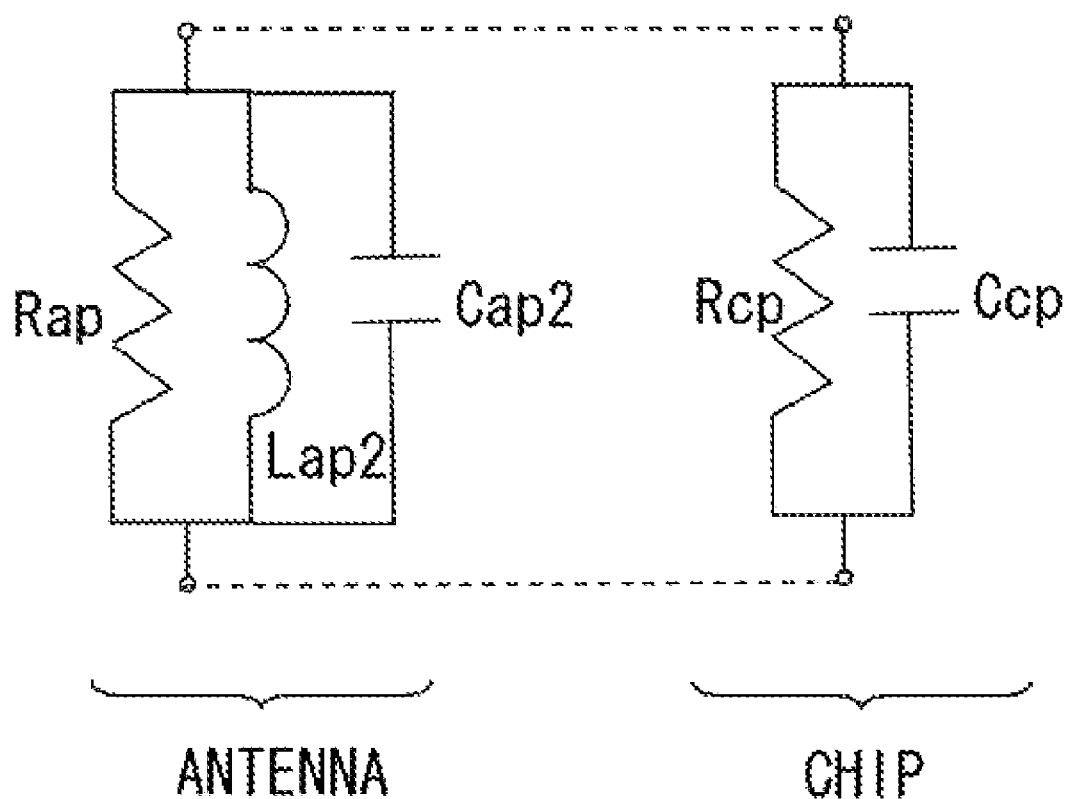
FIG. 20 is a circuit diagram illustrating an equivalent circuit of a chip and antenna of the RFID tag 1e.

FIG. 20 is a circuit diagram illustrating an equivalent circuit of a chip and antenna of the RFID tag 1e. The perimeter of a loop antenna of the RFID tag 1e is smaller than that of the RFID tag 1a. The inductance value Lap2 of the loop antenna is therefore smaller than Lap of the RFID tag 1a. The metallic patterns 5i and 5j are formed in an interdigital shape. The distance between the metallic patterns 5i and 5j that are in an interdigital shape is about 0.5 mm. Thanks to the above shape, the C-coupling of the metallic patterns 5i and 5j has capacitance Cap2. If Ccp of the chip 4 remains unchanged, a resonance condition is satisfied because the metallic patterns 5i and 5j have Cap2. Therefore, it is possible to match the chip 4 to the loop antenna. In this case, the resonance condition of the chip 4 and loop antenna is represented by the following equation.

$$f0 = \frac{1}{2\pi\sqrt{Lap2(Ccp + Cap2)}} \qquad [\text{Equation 2}]$$

Since the RFID tag 1e is smaller in size than the RFID tag 1a, the antenna gain of the RFID tag 1e is smaller than that of the RFID tag 1a. The communication distance of the RFID tag 1e is slightly shorter than that of the RFID tag 1a.

In each of the above embodiments, the lid 8, or both the container 7 and lid 8, may be omitted in such cases as where the strength of the antenna sheet 2a is sufficient. The core resin 6 may be omitted in such cases as where the strength of the antenna sheet 2a is sufficient. The film sheet 3 may be omitted in such cases as where the strength of the metallic patterns 5a and 5b is sufficient. An adhesive may be provided instead of the film sheet 3 in such cases as where the strength of the metallic patterns 5a and 5b is sufficient.

According to each of the above embodiments, a small wireless tag can be realized at low cost: the structure of the wireless tag is extremely simple with a longer communication distance, and the wireless tag is able to communicate even when being attached to metal.

A first conductor is, for example, the metallic pattern 5a or 5i. A second conductor is, for example, the metallic pattern 5b or 5j. A first curved surface refers to, for example, the shape of the metallic pattern 5a or 5i wound around the core resin 6. A second curved surface refers to, for example, the shape of the metallic pattern 5b or 5j wound around the core resin 6. A sheet is, for example, the antenna sheet 2a, 2b, 2d or 2e. A dielectric core refers to, for example, the core resin 6.

According to the techniques disclosed in the present application, the wireless tag being attached to metal can achieve stable performance.

1a, 1c, 1d, and 1e indicate RFID tags. 2a, 2b, 2c, and 2e indicate antenna sheets. 3 indicates an insulating film sheet. 4 indicates a chip. 5a and 5b indicate metallic patterns. 6 indicates core resin. 7 indicates a container. 8 indicates a lid. 11a and 11b indicate cuts. 12 indicates a laminate film. 21 indicates an antenna. 22 indicates a metallic plane. 23 indicates mirror current. 24a and 24b indicate overlap portions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless tag comprising:
    a dielectric core;
    a wireless communication circuit positioned above a surface of the dielectric core, that includes first and second terminals coupled to a loop antenna and performs wireless communication using the loop antenna;
    a first conductor that includes a third terminal coupled to the first terminal, and extends from the third terminal in a first direction along the surface of the dielectric core; and
    a second conductor that includes a fourth terminal coupled to the second terminal, and extends from the third terminal in a second direction different from the first direction along the surface of the dielectric core so that a part of the first conductor defining a first area overlaps with a part of the second conductor defining a second area, wherein
    the first conductor and the second conductor wind around the dielectric core, and a distance is kept between the first area and the second area.

2. The wireless tag according to claim 1, further comprising
    a dielectric cover that covers the circuit, the first conductor, and the second conductor.

3. The wireless tag according to claim 2, further comprising
    an insulating sheet that winds around the dielectric core so as to be sandwiched between the first and second conductors and keep the distance between the first and second areas equal to a thickness of the sheet.

4. The wireless tag according to claim 3, wherein
    the cover includes an elastic container and an elastic lid,
    a combination of the core, the first conductor, the second conductor and the sheet is put in the container,
    a height of the combination is longer than a height of an inner wall of the container, and
    the lid is bonded to the container.

5. The wireless tag according to claim 3, wherein
    an end part of the first area and an end part of the second area are capacitively coupled.

6. The wireless tag according to claim 5, wherein
    the end part of the first area and the end part of the second area form an interdigital shape.

7. The wireless tag according to claim 2, wherein
    the cover is provided by lamination.

8. The wireless tag according to claim 2, further comprising
    an adhesive that bonds the first and second areas together and keeps the distance between the first and second areas equal to a thickness of the adhesive.

9. The wireless tag according to claim 1, wherein
    the circuit is disposed at a specific position on the surface of the core,
    each of the first and second areas has a specific length in the circumferential direction of the loop antenna, and
    the specific position and the specific length are determined based on a specific frequency, a permittivity of the core, a size of the first conductor and a size of the second conductor, in order to maximize a distance of wireless communication of the wireless tag using the specific frequency.

10. The wireless tag according to claim 9, wherein
    marks is made on predetermined positions on a surface of the core respectively,
    the predetermined positions are related to predetermined frequencies respectively,
    the respective predetermined positions are determined based on the respective predetermined frequencies, the permittivity of the core, the size of the first conductor and the size of the second conductor, so as to maximize a distance of a wireless communication of the wireless tag using the respective predetermined frequencies, the predetermined positions include the specific position, and the predetermined frequencies include the specific frequency.

11. The wireless tag according to claim 1, wherein the first area includes a first cut, the second area includes a second cut, and the first and second cuts are combined so that the second area overlaps with the first area.

12. The wireless tag according to claim 1 wherein the circuit is disposed on a first surface of the core, the first and second areas are disposed on a second surface of the core, and the second surface is located on an opposite side of the core from the first surface.

13. The wireless tag according to claim 1, wherein the circuit is disposed on a first surface of the core, and the first and second areas are disposed on the first surface.

\* \* \* \* \*